United States Patent
Axmon et al.

(10) Patent No.: US 11,425,613 B2
(45) Date of Patent: Aug. 23, 2022

(54) INFORMATION BLOCK (IB) ACQUISITION BASED ON QUASI-STATIONARY IB CONTENT

(71) Applicant: TELEFONAKTIEBOLAGET LM ERICSSON (PUBL), Stockholm (SE)

(72) Inventors: Joakim Axmon, Limhamn (SE);
Muhammad Kazmi, Sundbyberg (SE);
Santhan Thangarasa, Vällingby (SE);
Kazuyoshi Uesaka, Kawasaki (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

(21) Appl. No.: 16/753,211

(22) PCT Filed: Oct. 2, 2018

(86) PCT No.: PCT/IB2018/057659
§ 371 (c)(1),
(2) Date: Apr. 2, 2020

(87) PCT Pub. No.: WO2019/069238
PCT Pub. Date: Apr. 11, 2019

(65) Prior Publication Data
US 2021/0153082 A1 May 20, 2021

Related U.S. Application Data

(60) Provisional application No. 62/566,783, filed on Oct. 2, 2017.

(51) Int. Cl.
*H04W 4/00* (2018.01)
*H04W 36/00* (2009.01)
(Continued)

(52) U.S. Cl.
CPC ....... *H04W 36/0055* (2013.01); *H04W 48/08* (2013.01); *H04W 48/16* (2013.01)

(58) Field of Classification Search
CPC ........... H04W 36/005; H04W 36/0055; H04W 48/16; H04W 48/08
(Continued)

(56) References Cited

U.S. PATENT DOCUMENTS

2016/0150419 A1* 5/2016 Thangarasa ....... H04W 36/0061
370/254

OTHER PUBLICATIONS

Huawei et al: "Cell search and system information acquisition improvements in el-eMTC", 3GPP Draft; RI-1712105, 3rd Generation Partnership Project. (3GPP), Mobile Competence Centre; 650, Route Des Lucioles, F-06921, Sophia-Antipolis Cedex, France. Retrieved from the Internet: URL:http://www.3gpp.org/ftp/tsg ran/ WG2 RL 2/TSGR2 99bis/Docs/—[retrieved on Sep. 28, 2017].
(Continued)

*Primary Examiner* — Temica M Beamer
(74) *Attorney, Agent, or Firm* — Christopher & Weisberg, P.A.

(57) ABSTRACT

A Wireless Device (WD), a network node and corresponding methods are disclosed. The WD comprises processing circuitry and a memory, the WD being adapted to obtain a Cell Global Identity (CGI) of a target cell within a first time period if the target cell transmits System Information (SI) where the fields other than frame numbers do not change in different transmission periods over a certain period of time, and otherwise, to obtain the CGI of the target cell within a second time period longer than the first time period. The WD is adapted to use information as to whether or not the target cell is going to transmit Quasi-Stationary SI (QSI) to select a first or a second SI acquisition procedure to obtain the CGI of the target cell within the first time period if QSI is transmitted, or within a second time period is non QSI is
(Continued)

using information as to whether or not a target cell 116 is going to transmit a quasi-stationary system information (QSI), where fields other than frame number do not change over different transmission periods, over a certain time period (T0), for adapting a procedure for acquiring the system information (SI) of the target cell 114 — 310 acquiring the SI of target cell 114 based on the adapted/selected procedure, i.e. if the target cell transmits QSI where the fields other than frame numbers do not change in different transmission periods over a certain period of time, obtaining a Cell Global Identity (CGI) of the target cell within a first time period, and otherwise, obtaining the CGI of the target cell within a second time period longer than the first time period. — 320 optionally, using the results involving the acquired SI of target cell 114 for one or more operational tasks — 330 transmitted. The network node determines whether or not the target cell is going to transmit QSI and informs a base station or the WD about whether or not the target cell is going to transmit QSI enabling the WD to optimize its SI acquisition procedure accordingly.

27 Claims, 3 Drawing Sheets

(51) Int. Cl.
  *H04W 48/08* (2009.01)
  *H04W 48/16* (2009.01)
(58) Field of Classification Search
  USPC ......................................................... 370/331
  See application file for complete search history.

(56) References Cited

OTHER PUBLICATIONS

Huawei et al: "System information acquisition enhancements for NB-IoT", 3GPP Draft; R2-1711334 System Information Enhancements in NB-IoT, 3rd Generation Partnership Project (3GPP), Mobile Competence Centre; 650, Route Des Lucioles ; F-06921 Sophia-Antipolis Cedex, France. Retrieved from the Internet: URL:http://www.3gpp.org/ftp/tsg ran/WG2 RL 2/TSGR2 99bis/Docs/—[retrieved on Sep. 28, 2017].

Ericsson: "Reduced system acquisition time for NB-IoT", 3GPP Draft; RI-1706894—Reduced System Acquisition Time for NB-IoT, 3rd Generation Partnership Project (3GPP), Mobile Competence Centre; 650, Route Des Lucioles ; F-06921 Sophia-Antipolis, Cedex, France. Retrieved from the Internet: URL:http://www.3gpp.org/ftp/tsg ran/WGI RL 1/TSGRI 89/Docs/—[retrieved on May 6, 2017].

Huawei et al: "Skip system information reading for MTC upon cell reselection", 3GPP Draft; R2-1711217, 3rd Generation Partnership Project (3GPP), Mobile Competence Centre; 650, Route Des Lucioles ; F-06921, Sophia-Antipolis Cedex, France. Retrieved from the Internet: URL:http://www.3gpp.org/ftp/tsg ran/WG2 RL 2/TSGR2 99bis/Docs/—[retrieved on Sep. 29, 2017].

Davidovic, Sasa, International Search Report: PCT/IB2018/05759, EPO, Rijswijk, The Netherlands, dated Dec. 7, 2018.

* cited by examiner

FIGURE 1

| determining whether or not a target cell of the network is going to transmit a quasi-stationary system information, QSI, (where fields other than frame numbers do not change in different transmission periods) over a certain period of time | 210 |

⇩

| informing the UE served by the serving cell of whether or not the target cell is going to transmit (QSI) over the certain period of time | 220 |

⇩

| optionally, receiving from the UE results of a measurement (e.g. CGI) performed by the UE and associated with the acquisition of the SI by the UE | 230 |

INFORMATION BLOCK (IB) ACQUISITION BASED ON QUASI-STATIONARY IB CONTENT

TECHNICAL FIELD

The present disclosure relates to the acquisition of information blocks in wireless transmissions frames.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

At least some of the following abbreviations may be used in this disclosure.
ACK Acknowledged
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
IB Information Block
M2M machine to machine
MAC Media access control
MBB Mobile broadband
MCG Master cell group
MDT Minimization of drive tests
MeNB Master eNode B
MIB Master information block
MME Mobility management entity
MRTD Maximum receive timing difference
MSR Multi-standard radio
NACK Not acknowledged
OFDM Orthogonal frequency division multiplexing
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PSCell Primary SCell
PSC Primary serving cell
PSS Primary synchronization signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
WD Wireless Device
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network The machine-to-machine (M2M) communication (also called machine type communication (MTC)) is used for establishing communication between machines and between machines and humans. The communication may comprise exchange of data, signalling, measurement data, configuration information, etc. In MTC, an MTC device's size may vary, for example, from that of a wallet to that of a base station. The M2M devices are often used for applications like for example sensing environmental conditions (e.g. temperature reading), metering or measurement (e.g. electricity usage etc.), fault finding or error detection etc. In these applications, M2M devices may be active only very seldom but over a consecutive duration, depending upon the type of service. For example, an MTC device may be active, e.g. 200 ms once every 2 seconds, or about 500 ms every 60 minutes etc. The M2M device may also do measurement on other frequencies or other RATs (Radio Access Technologies). The MTC device is also expected to be of low cost and low complexity. A low complexity WD for M2M operation may implement one or more low cost features like, like for example smaller downlink and uplink maximum transport block size (e.g. 1000 bits) and/or reduced downlink channel bandwidth of 1.4 MHz for data channel (e.g. PDSCH). A low cost MTC device may also comprise a half-duplex (HD-FDD) and one or more of the following additional features, single receiver (1 Rx) at the WD, smaller downlink and/or uplink maximum transport block size (e.g. 1000 bits) and reduced downlink channel bandwidth of 1.4 MHz for data channel. The low-cost MTC WD may also be termed as low complexity WD. A low-complexity WD (e.g. WD with 1 Rx) may also be capable of supporting enhanced coverage mode of operation.

In MTC (e.g. eMTC, FeMTC, eFeMTC etc), the broadcast information is transmitted via a physical broadcast channel (PBCH) and one or more system information blocks (SIBs). The PBCH carries the master information block (MIB), which carries initial information about the upcoming connection's parameters. Subsequent information blocks are typically called SIBs. The MIB periodicity is 40 ms with at least 4 transmissions blocks per 40 ms. The MIB periodicity is interchangeably called TTI. The first MIB transmission is typically in subframe #0 of radio frames for which the system frame number (SFN) mod 4=0, and repetitions are transmitted in subframe #0 of all other radio frames. For TDD/FDD system with a bandwidth larger than 1.4 MHz that supports bandwidth limited WDs or WDs in CE, MIB transmission may be additionally repeated in subframe #9 of the previous radio frame for FDD and subframe #5 of the same radio frame for TDD. The MIB carries information such as SFN, SIB1-BR scheduling information etc. The scheduling information of SIB1-BR may comprise the transport block (TB) size, number of repetitions of a channel (e.g. PDSCH) transmitting SIB1-BR etc. The system frame number (SFN) changes after every MIB TTI. However other information in the MIB may or may not change across the MIB TTI (depending on, for example, changing channel conditions, bandwidth allocation, etc).

In NB-IoT the broadcast information is transmitted via a narrow band physical broadcast channel (NPBCH) and one or more system information blocks (SIBs). The NPBCH carries MIB narrow band (MIB-NB) with a periodicity (e.g. TTI) of 640 ms and repetitions made within 640 ms. The first transmission of the MIB-NB is scheduled in subframe #0 of radio frames for which the SFN mod 64=0 and repetitions are scheduled in subframe #0 of all other radio frames. The MIB-NB carries information such as SFN, SIB1-NB scheduling information, NB-IoT mode of operation in the cell (e.g. in-band, guard band, standalone) etc. The MIB-NB scheduling information comprises e.g. TB size, number of repetitions (e.g. NPDSCH) used for transmitting SIB1-NB etc. The MIB-NB also carries information about the. The SFN changes after every MIB-NB TTI. However other information in the MIB-NB may or may not change across the MIB-NB TTI, depending of for example, changing channel conditions, bandwidth allocation, etc.

```
MasterInformationBlock ::=      SEQWDNCE {
    dl-Bandwidth                    ENUMERATED {
                                        n6,| n15, n25, n50, n75,
                                        n100},
    phich-Config                    PHICH-Config,
    systemFrameNumber               BIT STRING (SIZE (8)),
    schedulingInfoSIB1-BR-r13       INTEGER (0..31),
    spare                           BIT STRING (SIZE (5))
```

Exemplary MIB Contents in NB-IoT (as Per TS 36.331 v14.4.0):

```
MasterInformationBlock-NB ::=   SEQWDNCE {
    systemFrameNumber-MSB-r13       BIT STRING (SIZE (4)),
    hyperSFN-LSB-r13                BIT STRING (SIZE (2)),
    schedulingInfoSIB1-r13          INTEGER (0..15),
    systemInfoValWDTag-r13          INTEGER (0..31),
    ab-Enabled-r13                  BOOLEAN,
    operationModeInfo-r13           CHOICE {
        inband-SamePCI-r13              Inband-SamePCI-NB-r13,
        inband-DifferentPCI-r13         Inband-DifferentPCI-NB-r13,
        guardband-r13                   Guardband-NB-r13,
        standalone-r13                  Standalone-NB-r13
    },
    spare                           BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=            SEQWDNCE {
    rasterOffset-r13                ChannelRasterOffset-NB-r13,
    spare                           BIT STRING (SIZE (3))
}
Inband-SamePCI-NB-r13 ::=       SEQWDNCE {
    eutra-CRS-SeqWDnceInfo-r13      INTEGER (0..31)
}
Inband-DifferentPCI-NB-r13 ::=  SEQWDNCE {
    eutra-NumCRS-Ports-r13          ENUMERATED {same, four},
    rasterOffset-r13                ChannelRasterOffset-NB-r13,
    spare                           BIT STRING (SIZE (2))
}
Standalone-NB-r13 ::=           SEQWDNCE {
    spare                           |BIT STRING (SIZE (5))
```

There currently exist certain challenges with the current implementations.

In MTC (e.g. eMTC, FeMTC etc) or in NB-IoT, the duration of time required by the WD to acquire system information sufficient to move into a target cell is very long.

Table 1 gives several examples of SI acquisition delays associated with different procedures applied by an MTC WD (e.g. WD category M1, WD category M2) in a cell operating in normal coverage (e.g. CE Mode A) or enhanced coverage (e.g. CE Mode B).

For example, the time to acquire MIB or SFN of the cell in enhanced coverage (e.g. CE Mode B) can be as long as 2.56 seconds. This is extremely long, especially when performing handover or cell reselection to the target cell when the time factor may be important.

TABLE 1

System information acquisition delays in MTC

| | SI acquisition delay for WD cat M1/M2 in CE mode A or B ||
| WD Procedure | WD category M1/M2 in CE Mode A | WD category M1/M2 in CE Mode B |
| --- | --- | --- |
| MIB acquisition delay | 120 ms | 2560 ms |
| SIB1-BR acquisition delay | 160 ms | 2560 ms |
| SI acquisition delay in cell re-selection | 1280 ms | 6400 ms |
| CGI acquisition delay | 1280 ms | 5120 ms |
| SI acquisition delay in RRC re-establishment | 1280 ms | 6400 ms |
| SFN acquisition delay in handover | 120 ms | 2560 ms |

Table 2 also provides several examples of SI acquisition delays associated with different procedures applied by a NB-IoT WD (e.g. WD category NB1, WD category NB2) in a cell operating in normal coverage (NC) or enhanced coverage (EC) wrt the WD. For example, the time to acquire MIB-NB of the cell in enhanced coverage can be up to 2.56 seconds. This is also extremely long especially when cell reselection or RRC re-establishment to the target cell, when the time factor is critical.

TABLE 2

System information acquisition delays in NB-IoT

| | SI acquisition delay for WD cat NB1/NB2 in normal or enhanced coverage ||
| WD Procedure | WD category NB1/NB2 in NC | WD category NB1/NB2 in EC |
| --- | --- | --- |
| MIB-NB acquisition delay | 640 ms | 2560 ms |
| SIB1-NB acquisition delay | 5120 ms | 29440 ms |
| SIB2-NB acquisition delay | 2560 ms | 9560 ms |
| SI acquisition delay in cell re-selection | 8320 ms | 41560 ms |
| SI acquisition delay in RRC re-establishment | 8320 ms | 41560 ms |

It is therefore important to reduce SI acquisition delays, and especially the MIB acquisition delay, since MIB acquisition is the first step of the process of cell handover, and it is always required when acquiring the SI of the target cell.

SUMMARY

Certain aspects of the present disclosure and their embodiments may provide solutions to these or other challenges.

According to some embodiments, a UE (hereinafter generically called Wireless Device WD) served by a serving cell may be informed (e.g. by a network node) whether or not a target cell is going to transmit a quasi-stationary system information (QSI) within a period of time to come, e.g. during a certain duration (T0) starting from a reference time (Tr). The WD provided with such an information may then adapt its SI acquisition procedure, and if QSI is said to be sent, to use an SI acquisition procedure that allows for example certain fields to be combined from multiple SI transmissions, in order to obtain faster the desired set of SI required for effecting the cell change procedure.

Accordingly a WD, a network node and corresponding methods are disclosed. The WD comprises processing circuitry and a memory, the WD being adapted to obtain a Cell Global Identity (CGI) of a target cell within a first time period if the target cell transmits System Information (SI) where the fields other than frame numbers do not change in different transmission periods over a certain period of time, and otherwise, to obtain the CGI of the target cell within a second time period longer than the first time period. The WD is adapted to use information as to whether or not the target cell is going to transmit Quasi-Stationary SI (QSI) to select a first or a second SI acquisition procedure to obtain the CGI of the target cell within the first time period if QSI is transmitted, or within a second time period is non QSI is transmitted. The network node determines whether or not the target cell is going to transmit QSI, and informs a base station or the WD about whether or not the target cell is going to transmit QSI enabling the WD to optimize its SI acquisition procedure accordingly.

According to one embodiment, there is provided a method for adapting System Information (SI) acquisition in a Wireless Device (WD). If a target cell transmits SI where the fields other than frame numbers do not change in different transmission periods over a certain period of time, a Cell Global Identity (CGI) of the target cell is obtained within a first time period, and otherwise, the CGI of the target cell is obtained within a second time period longer than the first time period. The method may also use information as to whether or not the target cell is going to transmit SI that is Quasi-Stationary SI (QSI) where the fields other than frame numbers do not change in different transmission periods over the certain period of time to select a procedure for SI acquisition, wherein a first SI acquisition procedure is selected if the target cell transmits SI where the fields other than frame numbers do not change in different transmission periods over a certain period of time, and a second SI acquisition procedure is selected otherwise.

According to another embodiment, there is provided a Wireless Device (WD) comprising processing circuitry and a memory for storing instructions, the WD being adapted to obtain the CGI of a target cell within a first time period if the target cell transmits System Information (SI) where the fields other than frame numbers do not change in different transmission periods over a certain period of time, and otherwise, to obtain the CGI of the target cell within a second time period longer than the first time period. The WD may further be adapted to use information as to whether or not a target cell is going to transmit SI that is Quasi-Stationary SI (QSI) where the fields other than frame numbers do not change in different transmission periods over the certain period of time to select a procedure for SI acquisition, wherein a first SI acquisition procedure is selected to obtain the CGI of the target cell within a first time period, and a second SI acquisition procedure is selected to obtain the CGI of the target cell within the second time period.

According to yet another embodiment, there is provided a WD comprising a processing module and a memory module, the processing module being adapted to obtain a Cell Global Identity (CGI) of the target cell within a first time period if the target cell transmits SI where the fields other than frame numbers do not change in different transmission periods over a certain period of time, and otherwise, to obtain the CGI of the target cell within a second time period longer than the first time period. The WD may be further adapted to use information as to whether or not a target cell is going to transmit SI that is Quasi-Stationary SI (QSI) where the fields other than frame numbers do not change in different transmission periods over the certain period of time to select a procedure for SI acquisition, wherein a first SI acquisition procedure is selected to obtain the CGI of the target cell within the first time period, and a second SI acquisition procedure is selected to obtain the CGI of the target cell within the second time period.

According to yet embodiment, there is provided a method in a network node, the method determining whether or not a target cell is going to transmit quasi-static system information (QSI) where the fields other than frame numbers do not change in different transmission periods over a certain period of time during a cell change procedure of a WD towards the target cell, and to inform a base station or the WD about whether or not the target cell is going to transmit QSI for the certain period of time during the cell change procedure of the WD towards the target cell. Informing the WD about whether or not the target cell is going to transmit QSI for the certain period of time during the cell change procedure of the WD towards the target cell may support the WD to obtain a Cell Global Identity (CGI) of the target cell within a first time period, when QSI is to be transmitted.

According to one embodiment, there is provided a network node comprising processing circuitry and a memory for storing instructions, the network node being adapted to determine whether or not a target cell is going to send quasi-static system information (QSI) where the fields other than frame numbers do not change in different transmission periods over a certain period of time during a cell change procedure of a WD towards the target cell, and to inform a base station or the WD about whether or not the target cell is going to send QSI for the certain period of time during the cell change procedure of the WD towards the target cell. Informing the WD about whether or not the target cell is going to transmit QSI for the certain period of time during the cell change procedure of the WD towards the target cell may support the WD to obtain a Cell Global Identity (CGI) of the target cell within a first time period when QSI is to be transmitted.

According to these embodiments, the fields within the SI transmitted by the target cell may be divided, for example, into two groups, a first set of fields (F1), and a second set of fields (F2), wherein:
  Examples of fields belonging to F1 may be: frame number, connection frame number, SFN, hyper SFN etc, which are generically called frame counter, or counter-like fields.
  Examples of fields belonging to F2 may be: scheduling information, transport block size of physical channel carrying a SIB, number of repetitions of physical channel carrying a SIB etc.
The QSI and non-QSI (NQSI) may expressed as follows:
  A QSI transmission is said to be, for example, a transmission where one or more fields in F1 changes in every transmission period (e.g. TTI) of the SI within T0, but fields in F2 do not change; it is for example known that the frame number will change anyhow from one frame to another, so while such a change is expected, the SI is still considered to be quasi-stationary; and
  A non-QSI transmission is said to be, for example, a transmission where at least one field in F1 changes in every transmission period (e.g. TTI) of the SI within T0 (as described hereinbefore) and also at least one field in F2 may change in at least one transmission period (e.g. TTI) of the SI within T0.
The information whether the target cell is going to transmit QSI or NQSI during the period (e.g. T0 starting from Tr) is obtained by the WD (e.g. by pre-defined rule or by receiving it from the network node). The WD uses the obtained information for acquiring the SI in an optimized manner (e.g. during cell change to target cell, acquiring CGI etc) according to the following mechanisms:
  The WD acquires the SI of target cell using a first SI acquisition procedure 1 (P1) within a first time period (T1) provided that target cell transmits QSI within T0 starting from Tr; and
  Acquires the SI of target cell using a second SI acquisition procedure 2 (P2) within a second time period (T2) provided that target cell does NOT transmit QSI (rather non-QSI) within T0 starting from Tr, and wherein T1<T2 (e.g. T1=2 TTI of the SI, while T2=8 TTIs of the SI).

In procedure P1, the WD acquires the SI of cell2 by combining (e.g. soft combining) fields in F2 obtained from multiple SI transmissions within T0. This in turn reduces the delay (T1) in acquiring the SI of the target cell.

In procedure P2, the WD acquires the SI of cell2 using the normal legacy procedure, e.g. by not combining any of the fields in the SI across multiple SI transmissions within T0, but rather waiting until all fields necessary to the cell change are individually acquired in the target cell. This leads to significant delays (T2), longer when compared to the case when P1 is applied.

There are proposed herein various embodiments which address one or more of the issues disclosed herein.

Certain embodiments described hereinbefore may provide one or more of the following technical advantage(s).

According to certain embodiments, the WD is enabled to significantly reduce the time to acquire the SI of a target cell by allowing the WD to apply soft combining to increase the sensitivity of the decoding operation.

Accordingly, the average the time to execute procedures which involve SI acquisition time (e.g. cell re-selection, handover etc) is reduced for that WD, when QSI information is used by the target cell.

Complexity in terms of SI acquisition procedure is also reduced, in part due to the fact the WD no longer has always detect whether contents of MIB are changed or not.

The average WD power consumption may also be decreased since the WD is able to apply a more optimal procedure for acquiring the SI of a target cell.

DRAWINGS

Some of the embodiments contemplated herein will now be described in more details with reference to the accompanying drawings, wherein:

FIGS. 4.A and 4.B are high level node diagrams representative of exemplary embodiments of the invention.

DETAILED DESCRIPTION

Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix A.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, an MTC or M2M device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a WD implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device may include antenna, interfaces, processing circuitry, memory or other device readable medium, herein referred to as memory, and any other components as judged necessary. WD may include multiple sets of one or more of the illustrated components for different wireless technologies supported by WD, such as, for example, GSM, WCDMA, LTE, NR, WFi, WMAX, or BIWDtooth wireless technologies, just to mention a few. These wireless technologies may be integrated into the same or different chips or set of chips as other components within the WD.

In some embodiments, the WD may be configured with PCell and PSCell or with PCell, PSCell and one or more SCells such as in dual connectivity and/or carrier aggregation. The configured cells are WD specific, e.g. serving cells of the WD.

The WD is served by a serving cell which in a handover scenario has already been identified by the WD. The WD further identifies at least one other cell, which may be called a target cell or neighbour cell. In some embodiments, the serving cell and neighbour cell are served or managed by the first network node and the second network node, respectively. In some embodiments, the serving cell and neighbour cell are served or managed by the same network node e.g. a first network node.

The embodiments may be applicable for a WD both in a low or in high activity state. Examples of low activity state are RRC idle state, idle mode etc. Examples of high activity state are RRC CONNECTED state, active mode, active state etc. The WD may be configured to operate in DRX or in non-DRX. If configured to operate in DRX, it may still operate according to non-DRX as long as it receives new transmissions from the network node.

The term time resource used herein may correspond to any type of physical resource or radio resource expressed in terms of length of time. Examples of time resources are: symbol, time slot, subframe, radio frame, TTI, interleaving time, etc. The term TTI used herein may correspond to any time period (T0) over which a physical channel can be encoded and optionally interleaved for transmission. The physical channel is decoded by the receiver over the same time period (T0) over which it was encoded. The TTI may be also interchangeably called a short TTI (sTTI), transmission time, slot, sub-slot, mini-slot, mini-subframe etc.

The term cell change used herein may refer to selection of a target cell or change from one cell to another cell (aka target cell). Some examples of cell change are initial cell selection, cell selection when leaving an RRC state (e.g. leaving RRC_CONNECTED state), cell reselection, handover, RRC connection release with re-direction, RRC reconfiguration, RRC connection re-establishment, PCell change, PSCell change, SCell change, swapping between PCell and SCell etc. The cell change can be performed by the WD autonomously or it can be alternatively performed by the WD based on a message (e.g. cell change command) received from a network node.

The WD (e.g. MTC WD, NB-IoT WD) may operate under either normal coverage or enhanced coverage with respect to a cell. The enhanced coverage is also interchangeably called extended coverage. The WD may also operate in a plurality of coverage levels (CE) e.g. normal coverage (aka CE level 0), enhanced coverage level 1 (CE1), enhanced coverage level 2 (CE2), enhanced coverage level 3 (CE3) and so on.

The normal and extended coverage operations may typically take place on narrower WD RF bandwidth compared with the system bandwidth aka cell BW, cell transmission BW, DL system BW etc. In some embodiments, the WD RF BW can be the same as of the system bandwidth. Examples of narrow RF BWs are 200 KHz, 1.4 MHz (e.g. 6 RBs), 5 MHz (e.g. 24 RBs) etc. Examples of system BW are 200 KHz, 1.4 MHz, 3 MHz, 5 MHz, 10, MHz, 15 MHz, 20 MHz etc. In case of extended/enhanced coverage, the WD may be capable of operating under lower signal quality level (e.g. SNR, SINR, ratio of average received signal energy per subcarrier to total received power per subcarrier (Es/lot)), RSRQ etc) compared to its capabilities when operating in legacy systems. The coverage level enhancement may vary with the operational scenario and may also depend on the WD type. For example, a WD located in a basement with poor radio coverage may need larger level of radio coverage enhancement (e.g. 20 dB) compared to a WD located at a cell border (e.g. −3 dB).

The coverage level of the WD may be defined with respect to any cell e.g. serving cell, non-serving cell, neighbour cell etc. The coverage level is also interchangeably called as the coverage enhancement (CE) level. For example, the CE level with regard to a cell can be expressed in terms of signal level received at the WD from that cell. Alternatively, the CE level of the WD with regard to a cell can be expressed in terms of signal level received at the cell from the WD. As an example, received signal level can be expressed in terms of received signal quality and/or received signal strength at the WD with regard to the cell. More specifically the coverage level may be expressed in terms of:

received signal quality and/or received signal strength at the WD wrt a cell, and/or received signal quality and/or received signal strength at the cell wrt the WD.

Examples of signal quality may be SNR, SINR, CQI, RSRQ, NRSRQ, CRS $\hat{E}s/Iot$, SCH $\hat{E}s/Iot$ etc. Examples of signal strength may be path loss, path gain, RSRP, NRSRP, SCH_RP etc. The notation $\hat{E}s/Iot$ is defined as ratio of:

$\hat{E}s$, which is the received energy per RE (power normalized to the subcarrier spacing) during the useful part of the symbol, i.e. excluding the cyclic prefix, at the WD antenna connector, to Iot which is the received power spectral density of the total noise and interference for a certain RE (power integrated over the RE and normalized to the subcarrier spacing) as measured at the WD antenna connector The CE level is also expressed in terms of two or more discrete levels or valWDs e.g. CE level 1, CE level 2, CE level 3 etc. An example of 2 coverage levels defined wrt signal quality (e.g. SNR) at the WD may be:

Coverage enhancement level 1 (CE1) comprising of SNR≥−6 dB at WD with regard to a cell; and Coverage enhancement level 2 (CE2) comprising of −15 dB≤SNR<−6 dB at WD with regard to a cell.

In the above example, CE1 may also be interchangeably called as normal coverage level, baseline coverage level, reference coverage level, legacy coverage level etc. On the other hand, CE2 may be termed as enhanced coverage or extended coverage level.

Another example two different coverage levels (e.g. normal coverage and enhanced coverage) may be defined in terms of signal quality levels as follows:

The requirements for normal coverage are applicable for the WD category NB1 or WD category NB2 with regard to a cell provided that radio conditions of the WD with respect to that cell are defined as follows:

SCH $\hat{E}s/Iot \geq -6$ dB and CRS $\hat{E}s/Iot \geq -6$.

The requirements for enhanced coverage are applicable for the WD category NB1 or WD category NB2 with regard to a cell provided that radio conditions of the WD with respect to that cell are defined as follows:

SCH $\hat{E}s/Iot \geq -15$ dB and CRS $\hat{E}s/Iot \geq -15$.

A parameter defining coverage level of the WD with respect to a cell may also be signalled to the WD by the network node. Examples of such parameters are CE Mode A and CE Mode B signalled to WD category M1, WD category M2 etc. The WD configured with CE Mode A and CE Mode B are also said to operate in normal coverage and enhanced coverage respectively. For example:

The requirements for CE Mode A apply provided the WD category M1 or WD category M2 is configured with CE Mode A, SCH $\hat{E}s/Iot \geq -6$ dB and CRS $\hat{E}s/Iot \geq -6$ dB.

The requirements for CE Mode B shall apply provided the WD category M1 or WD category M2 is configured with CE Mode B, SCH $\hat{E}s/Iot \geq -15$ dB and CRS $\hat{E}s/Iot \geq -15$ dB.

In the above examples $\hat{E}s/Iot$ is the ratio of received power per subcarrier to the total interference including noise per subcarrier.

Figure 1:
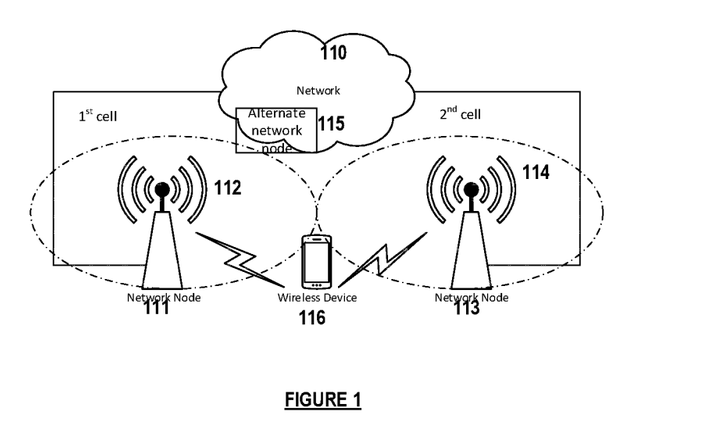
FIG. 1 is a high-level network diagram representative of an exemplary embodiment of the invention.
Figure 5:
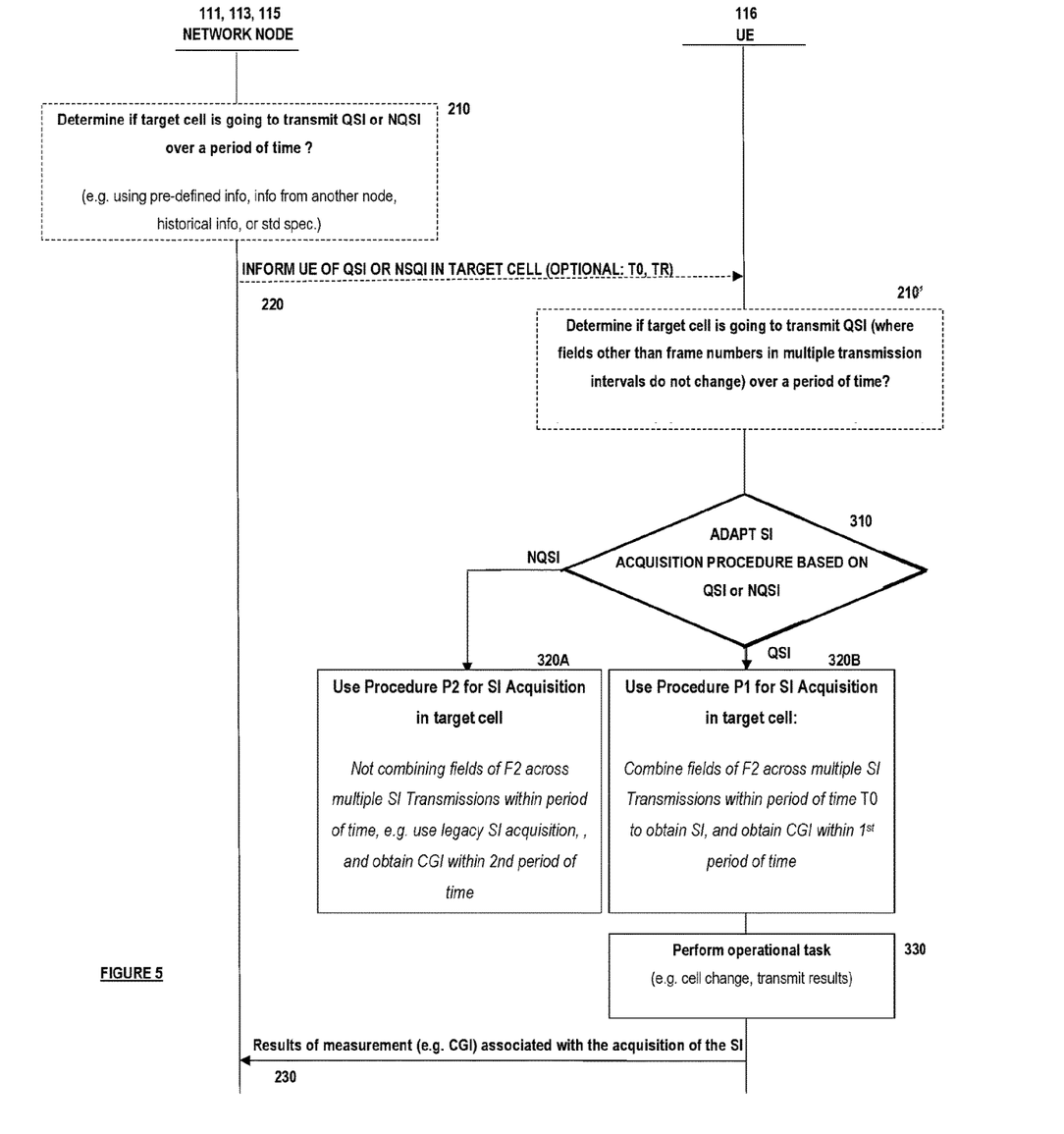
FIG. 5 is a nodal operation and signal flow diagram representative of another exemplary embodiment of the invention.

Reference is now made jointly to FIG. 1, which illustrates an exemplary network 110 implementing certain embodiments, and to FIG. 5, illustrating a high-level nodal operation and signal flow diagram of certain embodiments.

A network node (e.g. a base station 111, another network node 115) may first determine, action 210, if a target cell 116 is going to transmit QSI or NQSI over a period of time, for example by using pre-defined information, information from another node, historical info, or using a standard specification. As mentioned hereinbefore, QSI means for example SI where fields other than frame numbers do not change in different transmission periods over a certain period of time.

Then, the network node may inform, action 220, the WD 116 whether or not the target cell 116 is going to transmit QSI or NQSI over a period of time.

Alternatively, the WD 116 may determine via other means, e.g. by itself, in action 210', whether or not the target cell 116 is going to transmit QSI or NQSI over the period of time. Actions 210/220 and 210' are shown in dotted lines as one of them may be optional.

Provided with the information as to whether or not the target cell 116 is going to transmit QSI or NQSI over e.g. a period of time, the WD 116, in action 310 may adapt its SI acquisition procedure accordingly. If NQSI is to be expected, the WD 116 uses, action 320A, a procedure P2 for SI acquisition in the target cell, where it does not combine fields of F2 across multiple SI Transmissions within period of time, but rather uses a normal legacy SI acquisition procedure. Otherwise, if QSI is expected, the WD 116 uses a Procedure P1, action 320B, for SI acquisition in the target cell 114 where it combines fields of F2 from multiple SI transmissions within the period of time T0 to obtain faster the SI and the CGI of the target cell, i.e. in a period of time that is smaller than the period od time for obtaining the CGI using procedure P2.

Following the SI acquisition, the WD 116 may perform an operation tasks, action 330, such as for example a cell change or a reporting of measurements, action 230 to the network node 111.

Figure 2:
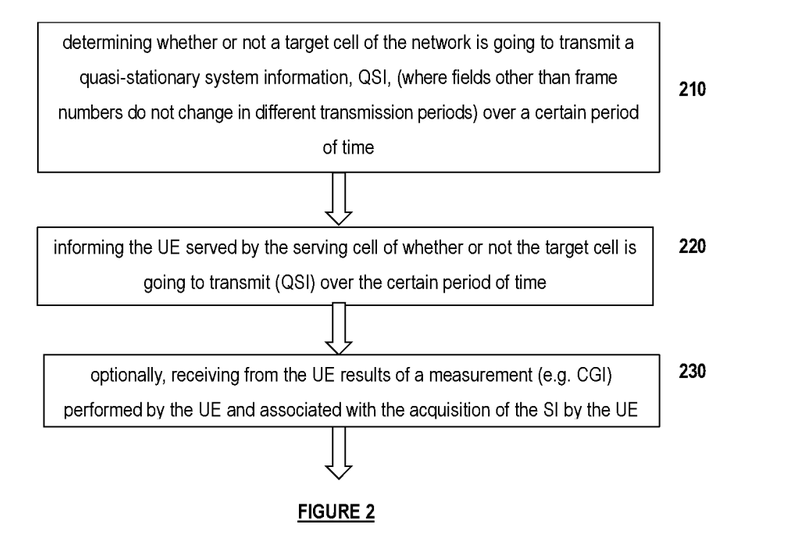
FIG. 2 is a flowchart diagram representative of another exemplary embodiment of the invention.

Reference is now made jointly to FIG. 1, which illustrates an exemplary network 110 implementing certain embodiments, and to FIG. 2, illustrating a flowchart diagram of a corresponding method.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WMax), BIWDtooth, Z-Wave and/or ZigBee standards.

The wireless network may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network nodes 111, 113, 115 and WD 116 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

FIG. 1 shows the WD 116 being currently served by a base station or network node 111 (e.g. eNB) serving a current cell 112 while being in a cell change scenario towards second, target cell 114. FIG. 2 shows a method for execution in a network node, that may be the network node 111 (i.e. the base station currently serving the WD 116), or an alternate network node 115 elsewhere in the network 110, and the method comprising the following steps:

determining (action 210) whether or not the target cell 114 of the network 110 is going to transmit a quasi-stationary system information (QSI) where fields other than frame numbers do not change in different transmission periods over a certain period of time during a cell change procedure of a WD towards the target cell;

informing (action 220) a base station or the WD 116 about whether or not the target cell is going to transmit QSI for the certain period of time during the cell change procedure of the WD towards the target cell, to supports the WD to obtain a Cell Global Identity (CGI) of the target cell within a first time period when QSI is to be transmitted; and optionally, receiving (action 230) from the WD 116 results of a measurement (e.g. CGI) performed by the WD 116 and associated with the acquisition of the SI by the WD 116.

Step 210

In step 210, it is assumed that the WD 116 is served by the first cell 112 and is expected to perform e.g. a cell change procedure related to a second cell 114. First and second cells may be served or managed by the same network node or by different network nodes (the later scenario being the one exemplified in FIG. 1).

According to certain embodiments, the WD 116 acquires system information (SI) of target cell 114. Examples of such procedures which require SI acquisition are measurements (e.g. time to acquire cell global ID (CGI) of cell2), cell change (e.g. cell reselection, handover, RRC reconfiguration, RRC re-establishment, RRC connection release with redirection etc).

The network node 111 (or network node 115) may determine the type or characteristics of SI in terms of the variation of the contents of the fields over time, which are going to be transmitted in the target cell 114 over a certain time period (such as for example the time period (T0) starting from a reference time (Tr)).

Examples of types of SI in terms of the variation of the contents of the fields over time are:

1. a quasi-stationary system information (QSI) and 2. a non-quasi-stationary system information (NQSI)

According to present embodiments, the system information (SI) transmitted by target cell 114 are assumed to be divided into two groups:

a first set of fields (F1) and a second set of fields (F2).

In QSI transmission scheme at least one field in F1 changes in every transmission period (e.g. TTI) of the SI within T0, but fields in F2 do not change.

In NQSI transmission scheme at least one field in F1 changes in every transmission period (e.g. TTI) of the SI within T0 and at least one field in F2 also changes in at least one transmission period (e.g. TTI) of the SI within T0.

Examples of the reference time (Tr) may be: a reference time of cent a reference time of cell2, an absolute time (e.g. UTC, GNSS time etc), a time instance when a message or a command is transmitted to the WD to perform certain WD procedure etc.

Examples of WD procedures are cell change (e.g. handover command), performing a measurement (e.g. CGI acquisition etc) etc.

Examples of the reference time of cell1 and cell2 are reference SFN of cell1 and reference SFN of cell2 respectively.

Examples of reference SFN are SFN=0, SFN=512 etc.

The network node determines whether the target cell 114 is going to transmit QSI or NQSI based on one or more of the following procedures:

1. By receiving information from another network node (e.g. node 115, or base station 113) serving or managing target cell 114,
2. Based on pre-defined information stored in the network node 113 e.g. during certain period of time target cell 114 transmits QSI while during the remaining time period cell2 transmits NQSI.
3. Based on historical data and statistics. Or
4. Based on definition in standard specifications, e.g. it is specified that certain fields of SIB remain static over at least a certain time, e.g X ms.

The network node 111, 115 may initiate or trigger the determination whether the target cell 114 is going to transmit QSI or NQS in cell 114 over a period of time (e.g. T0 starting from Tr), based on one or more of the following means:

Upon receiving a request from the WD 116,
When the WD 116 is expected to perform a cell change e.g. cell reselection, handover, etc,
When the network node 111, 115 needs to transmit a cell change command to the WD to change from current cell to a target cell,
When the network node 111, 115 needs to request the WD to perform a measurement on signals of cell2 which require the WD to acquire the SI information of the target cell,
When the WD that needs to acquire the SI of target cell is capable of adapting a procedure for SI acquisition based on whether cell2 transmits QSI or NQSI.
When the signal quality or signal strength of the target cell is greater than a certain threshold with regard to the WD which could be an indication that target cell can be candidate for cell change.
When the signal quality or signal strength of cell1 is becoming weaker, this could mean that WD may have to look for candidate cells for fast cell change.

A general example of classification of F1 and F2 in a broadcast channel (e.g. PBCH) is shown in table 3. In F1, at least one field within F1 changes every transmission time of the SI e.g. every TTI of SI. For example, frame number will change in every TTI of PBCH. F1 may also contain certain parameters or fields within F1 which changes periodically but not every TTI e.g. the hyper frame number changes every hyper frame number cycle. On the other hand, one or more fields or parameters belonging to F2 may or may not change over time. The change of fields in F2 does not follow any specific pattern, rather the change depends on several factors (e.g. change in cell coverage enhancement level, WD performance such as time to acquire SI, retuning or modification of cell parameters such as cell BW etc).

TABLE 3

Examples of classification of F1 and F2 in broadcast channel

| Examples of first type of field (F1) | Examples of second type of field (F2) |
| --- | --- |
| Frame number | DL bandwidth of cell |
| Hyper frame number | Transport format of SIB1 (e.g. TB size) |
| | Number of repetition of SIB1 within SIB1 TTI |
| | Control channel configuration e.g. PHICH |

A specific example of classification of F1 and F2 in a broadcast channel (e.g. PBCH) used for transmitting MIB for MTC WD (e.g. WD category M1, WD category M2 etc) is shown in table 4.

TABLE 4

Examples of classification of F1 and F2 in PBCH used in MTC

| Examples of first type of field (F1) | Examples of second type of field (F2) |
| --- | --- |
| SFN | DL bandwidth of cell |
| | Scheduling information of SIB1-BR |
| | PHICH configuration[Note1] |

Note1

Not used by an MTC device, but the field is part of the MIB message.

Another specific example of classification of F1 and F2 in a broadcast channel (e.g. NPBCH) used for transmitting MIB for NB-IoT WD (e.g. WD category NB1, WD category NB2 etc) is shown in table 5.

TABLE 5

Examples of classification of F1 and F2 in NPBCH used in NB-IoT

| Examples of first type of field (F1) | Examples of second type of field (F2) |
| --- | --- |
| SFN | DL bandwidth of cell |
| Hyper SFN | Scheduling information of SIB1-NB) |
| | Operational mode: in-band, guard-band and standalone |
| | Channel raster offset |
| | In-band same PCI |
| | In-band different PCI |
| | SI valWD tag |
| | An-Enabled |

In one example, transmission of QSI or NQSI may be required by the cells supporting coverage enhancement. In typical coverage enhancement scenario, devices can be mostly stationary and transmit/receive only small amount of data quite seldom. This means many of the fields included in the F2 may not change over the time. In such scenario, requiring the target cell to transmit QSI/NQSI information can help the devices to use the specific decoder algorithm to improve the broadcast channel and acquire the SI which can result in reduced power consumption and also increased overall network performance since many procedures depend on SI acquisition.

Step 220

In step 220 the network node 111 transmits to the WD the determined information (of step 210) related to SI transmission (QSI or NQSI) in target cell 114.

The network node 111 may inform the WD 116 about the determined information whether the target cell 114 is going to transmit QSI or NQSI by using any of the following means:

by transmitting a dedicated or WD specific message or command to the WD e.g. measurement configuration message (e.g. to acquire SI of cell2), cell change message (e.g. RRC reconfiguration message, handover command etc) etc.

by transmitting the information in a cell specific or common message e.g. transmitting information in a SIB of cell1 e.g. SIB2 of target cell 114.

The information may also contain an indicator or more details related to any changes in F1 and/or F2. In one example, the network node may indicate whether QSI or NQSI is going to be transmitted in target cell 114 or being transmitted during T0, where T0 can be pre-defined and/or Tr can be pre-defined (e.g. reference time of serving cell 112, such as serving cell SFN=0).

In one further example, the network node 111 may indicate whether QSI or NQSI is going to be transmitted in the serving cell 114, where the network node 111 also provides information about T0 and/or Tr.

The values of T0 and/or Tr may further depend on the coverage enhancement (CE) level of the WD with regard to a cell e.g. CE level for serving cell 112 and/or for target cell 114. As an example, T0 may be shorter for normal CE level and may be relatively longer for enhanced CE level. For example, T0=4 TTI of PBCH in normal CE level for a cell, and T0=8 TTI of PBCH in enhanced CE level of the WD for a cell. The network node 111 may determine the values of T0 based on the coverage level of the WD for a cell (e.g. for the target cell 114) whose SI is to be acquired by the WD 116. The network node 111 can determine the CE level of the WD 116 based on one or more of: the WD measurement report, the number of repetitions used by the WD for transmitting an UL signal (e.g., random access channel) etc. In yet another example, if the target cell 114 operates in enhanced coverage mode (e.g. cell can serve WDs at signal quality corresponding to enhanced CE level e.g. SINR≥−15 dB) then the network node 111 may select the values of T0 (T0=$T_{EC}$) corresponding to the enhanced CE level; otherwise if the target cell 114 operates in normal coverage mode then the network node 11 selects the values of T0 (T0=$T_{NC}$) corresponding to the normal CE level. As an example, $T_{NC} < T_{EC}$.

The network node 111 then checks whether the SI of cell2 is going to be QSI or NQSI over the determined values of T0 starting from Tr. For example, the network node 111 may determine this by requesting the target cell 114 whether it is going to transmit QSI or NQSI over T0. Another possibility is that the network node 111 may request target cell 114 to inform of the time duration over which it is going to transmit QSI or NQSI starting from Tr. In response, the target cell 116 can provide this information back to the network node 114, and/or also to the WD 116 (e.g. in cell change command or message sent to the WD). For example, in the cell change command the serving cell 112 may inform the WD 116 whether the SI of cell2 is QSI or NQSI over T0 starting from Tr. Then, based on the acquired information (whether SI is QSI or NQSI), the WD 116 can adapt its SI acquisition procedure (for example, to apply P1 if SI is QSI or P2 if SI is NQSI) to acquire the SI of cell2.

Step 230

In step 230, which is optional, the network node 111 receives results of a radio measurement which is performed by the WD 116 and which is associated with the acquisition of the SI of the serving cell 114. For example, the network node 111 may receive the results of CGI of the serving cell 116 acquired by the WD 116 by taking into account whether the serving cell 114 has transmitted QSI or NQSI over T0. For example, if the target cell 114 transmitted QSI over T0 then the network node 111 receives the measurement results from the WD over a shorter time period (Ta) compared to the case if the target cell 114 transmitted NQSI over T0. In the later case, the WD 116 performs measurement over a longer time period (Tb) where Tb>Ta.

Figure 3:
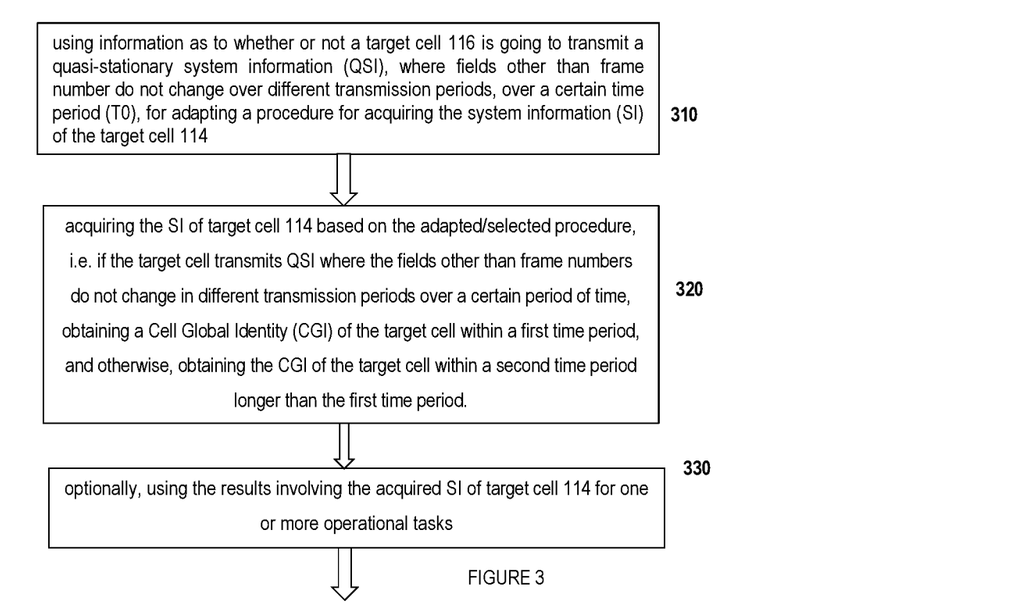
FIG. 3 is a flowchart diagram representative of yet another exemplary embodiment of the invention.

Reference is now made jointly to FIG. 1, previously described, and to FIG. 3, which shows another flowchart of an exemplary embodiment implemented in the WD 116.

Accordingly, there is provided a method implemented in the WD 116, comprising the steps of:

using information as to whether or not a target cell 116 is going to transmit a quasi-stationary system information (QSI) over a certain time period (T0), for adapting (action 310) a procedure for acquiring the system information (SI) of the target cell 114, acquiring (action 320) the SI of cell2 based on the adapted procedure, and optionally, using (action 330) the results involving the acquired SI of cell2 for one or more operational tasks.

Step 310

In step 310, the WD 116 may first obtain information, or be provided information, as to whether:

target cell 114 is going to transmit the quasi-stationary SI (QSI) (e.g. quasi-stationary MIB over PBCH, MIB-NB over NPBCH etc) during the period of time (e.g. T0 starting from Tr) or target cell 114 is going to transmit the non-quasi-stationary SI (NQSI) (e.g. non quasi-stationary MIB over PBCH, MIB-NB over NPBCH etc) during the period of time (e.g. T0 starting from Tr).

The WD 116 may obtain the above-mentioned information about SI transmission in target cell 114 based on any one or more of the following mechanisms:

based on one or more pre-defined rules. For example, the WD 116 may assume that upon receiving a cell change message for doing cell change to target cell 114, target cell 114 always transmit QSI over e.g. the period T0 starting from Tr. For example, when the WD 116 is requested to do cell change to target cell 114, then target cell 114 deliberately transmits QSI over T0 to enable the WD to acquire SI of target cell 114 over shorter time.

by receiving the information from the network node 111 or 115 e.g. information received from serving cell during cell change procedure, during measurement procedure etc.

based on historical data, past statistics and experience. E.g. the WD 116 may analyse the contents of the received SIB over last X minutes to determine how frequency the contents change, and which part of the contents change. Based on such analysis, then WD 116 can determine whether SI is transmitted using QSI or NQSI.

In some examples, the WD 116 may also receive this information from other nodes in the network, which also include indicated received from a D2D relay WD.

In some example, WD 116 may assume QSI or NQSI based on the type of operation/service. E.g. WD 116 may assume that QSI is used when WD 116 is operating in enhanced coverage, but NQSI is used otherwise.

The WD 116 then uses the received information about the QSI or NQSI to adapt its procedure for acquiring the SI of target cell 114. The adaptation of the procedure may include selecting one of the plurality of procedures, modifying or change one or more steps of the procedure etc.

In one specific example the WD adapts or selects:

a first procedure (P1) for acquiring the SI of target cell 114 provided that target cell 114 is going to transmit QSI over the period, e.g. T0 starting from Tr and a second procedure (P2) for acquiring the SI of target cell 114 provided that target cell 114 is going to transmit NQSI over the period, e.g. T0 starting from Tr.

The procedures P1 and P2 may differ in that the WD 116 is able to acquire the SI of target cell 114:
- during a first time period (T1) when applying procedure P1 and
- during a second time period (T2) when applying procedure P2, where T1<T2.

In procedure P1 and procedure P2 the WD applies different type of decoding mechanisms to acquire the SI of target cell 114, as follows:

In procedure P1 the WD combines signals containing at least certain contents of the SI sent by the target cell 114 across two or more transmission times (e.g. TTIs) of the SI within T0. For example, the WD 116 may combine some contents of fields in F2 across two or more TTIs of the SI of target cell 114 within T0. In another example, the WD 116 combines some contents of fields in F2 and as well as selected fields of F1 across TTIs of the SI of target cell 114 within T0. Examples of selected fields are those whose content does not change across the TTIs. In a specific example in P1 the WD combines all fields except the field containing SFN of the target cell, across the TTIs of the SI of the target cell. The procedure of combining of signals (e.g. soft combining) across the TTIs enables the WD 116 to enhance the received signal quality (e.g. SNR, SINR etc) of the SI of the target cell 114. For example, the SNR can be enhanced by 2-3 dB by combining over 2 successive MIB transmissions each over TTI of 40 ms. The combined signal is then used to decode the SI. This in turn advantageously reduces the time to acquire the SI of the target cell.

In procedure P2 the WD does not combine signals containing the SI of target cell 114 received from two or more transmission times (e.g. TTIs) within T0. This is because one or more contents belonging to F2 change across TTIs or are expected to change across the TTIs within T0. Rather, the WD 116 simply uses the normal legacy procedure for SI acquisition until enough data is gathered for the cell change to take place.

Step 320

In step 320, the WD 116 applies the adapted or selected procedure (P1 or P2) for acquiring the SI of target cell 114. This is explained with several examples below:

The procedure P1 can particularly be used by the WD 116 for reducing the time to acquire CGI of a target cell (target cell 114) using autonomous gaps created by the WD 116. This is explained with an example below:

If the MIB in PBCH of target cell 114 is QSI over T0 then the WD (e.g. MTC WD such as WD category M2) acquires the CGI of target cell 114 using procedure P1 within a time period of e.g. 3040 ms and If the MIB in PBCH of target cell 114 is NQSI over T0 then the WD (e.g. MTC WD such as WD category M2) acquires the CGI of cell2 using procedure P1 within a time period of e.g. 5120 ms.

In other words, the target cell transmits SI where the fields other than frame numbers do not change in different transmission periods over a certain period of time, the Cell Global Identity (CGI) of the target cell is obtained within a first time period, and otherwise, obtaining the CGI of the target cell is obtained within a second time period longer than the first time period.

In the above example the CGI acquisition of target cell 114 requires the WD 116 to decode MIB and SIB1 (e.g. SIB1-BR, SIB1-NB etc) of the target cell 114. The procedure P1 considerably reduces the MIB acquisition delay, which in turn reduces the overall time to acquire the CGI of target cell 114.

The procedure P1 can also be used by the WD 116 for reducing the time to perform cell change to the target cell 114. This is explained with an example below:

An example of time required by the WD 116 to perform cell change to cell2 ($T_{CS}$) is expressed in (1):

$$T_{CS} = f(T_{SI}, T_{search}, T_{IU}, \alpha) \quad (1)$$

A specific example of $T_{CS}$ based on (1) is expressed in (2):

$$T_{CS} = T_{SI} + T_{search} + \alpha \quad (2)$$

where $T_{SI}$, $T_{IU}$ and $T_{search}$ correspond to time to acquire SI of target cell 114, time to search target cell 114 and the time required to complete the transmission of PRACH in target cell 114, respectively. The parameter $\alpha$ is a constant and depends on WD processing and implementation margin; it may further depend on the CE level of the WD wrt a cell. For example $\alpha=20$ ms in normal CE level and $\alpha=100$ ms in enhanced CE level. These parameters ($T_{SI}$, $T_{IU}$ and $T_{search}$) further depend on the coverage enhancement (CE) level of the WD wrt serving cell 112 and/or wrt target cell 114. The parameter ($T_{SI}$) is the least time to acquire the MIB of cell2 e.g. $T_{SI} = T_{MIB}$.

If the SI (e.g. MIB) of target cell 114 is QSI over T0 then the WD 116 may perform cell change to target cell 114 (e.g. HO) within $T_{CS1}$ as expressed in (3):

$$T_{CS1} = T_{SI1} + T_{search} + T_{IU} + \alpha \quad (3)$$

But if the SI (e.g. MIB) of cell2 is NQSI over T0 then the WD can perform cell change to target cell 114 (e.g. HO) within $T_{CS2}$ as expressed in (4), where $T_{SI1} < T_{SI2}$ and it results in that $T_{CS1} < T_{CS2}$:

$$T_{CS2} = T_{SI2} + T_{search} + T_{IU} + \alpha \quad (4)$$

In yet another aspect of this embodiment, actual SI acquisition delay may further depend on the actual duration (T0) over which the transmission of the SI of target cell 114 is known to be QSI. For example, T0 should be long enough to ensure that the WD 116 is able to effectively combine the SI across multiple TTIs to decode the SI. This is further explained below:

the WD 116 may acquire the SI of target cell 114 within time T1 using procedure P1, provided that the SI of target cell 114 is transmitted using QSI over T0 and T0 is equal to or larger than the time required by the WD 116 to acquire the SI of target cell 114 using procedure, P1, the WD 116 acquires the SI of target cell 114 within time T2 even if the SI of target cell 114 is transmitted using QSI over T0 but T0 is shorter than the time required to acquire the SI of cell2 using procedure, P1.

This also impacts the performance of any WD procedure which involves the acquisition of the SI of the target cell e.g. cell change procedure. For example the cell change delay is expressed as follows:

If MIB in target cell 114 is transmitted using QSI over T0 and the time required by the WD to acquire the MIB of target cell 114 is TSI1 while T0≥TSI1 then the WD 116 performs cell change within time period $T_{CS1}$ as expressed in (3). This is realized by the WD 116 by applying procedure P1 to acquire the SI of the target cell e.g. MIB of target cell 114. Procedure P1 may for instance imply usage of multiple PBCH messages from different TTIs in the decoding operation to achieve more reliable decision metrics, using, optionally and in part, some techniques as described in PCT/EP2016/057392, herein included by reference in its entirety.

If MIB in target cell 114 is transmitted using QSI over T0 and the time required by the WD to acquire the MIB of target cell 114 is TSI1 while T0<TSI1 then the WD 116 shall perform cell change within time period $T_{CS2}$ as expressed in (4). This is because the WD 116 cannot apply procedure P1 to acquire the SI of the target cell (e.g. MIB of target cell) because T0 is too short. Instead, the WD 116 has to apply the procedure P2 which enables the WD to acquire the SI of the target cell within the longer time TSI2. In this example, TSI2>TSI1.

Step 330 (Optional)

In this step, which is optional, the WD 116 uses the results of the performed operation 320 which involves the acquisition of SI (e.g. PBCH etc) of target cell 114 for performing one or more operational tasks. Examples of such tasks are a cell change procedure, or transmitting the results of the measurement (e.g. CGI of cell2) to the network node.

Figure 4:
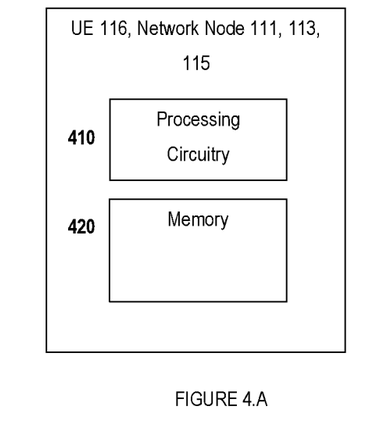

Reference is now made to FIG. 4.A showing a high-level node diagram of the WD 116 or of the network Node 111, 113, or 115.

For the WD 116, the WD comprises processing circuitry 410 and a memory 420, which are operationally connected and arranged in such a manner so as to enable the WD 116 to perform the all actions described hereinabove in relation to the WD 116.

For the network node 111, 113, or 115, the node also comprises processing circuitry 410 and a memory 420, which are operationally connected and arranged in such a manner so as to enable the node to perform all actions described hereinabove in relation to the network node.

Processing circuitry may be configured to perform any determining, calculating, or similar operations (e.g., certain obtaining operations) described herein as being provided by a network node. These operations performed by processing circuitry may include processing information obtained by processing circuitry by, for example, converting the obtained information into other information, comparing the obtained information or converted information to information stored in the network node, and/or performing one or more operations based on the obtained information or converted information, and as a result of said processing making a determination.

Processing circuitry may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node components, such as device readable medium, network node functionality. For example, processing circuitry may execute instructions stored in the memory. Such functionality may include providing any of the various wireless features, functions, or benefits discussed herein. In some embodiments, processing circuitry may include a system on a chip (SOC).

In some embodiments, processing circuitry may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units.

In alternative embodiments, part or all of RF transceiver circuitry and baseband processing circuitry may be on the same chip or set of chips, boards, or units.

The memory 420 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. The memory 420 may store any suitable instructions, data or information, including a computer program, software, an application including one or more of logic, rules, code, tables, etc. and/or other instructions capable of being executed by processing circuitry 410 and, utilized by network node or the WD. The memory 420 may be used to store any calculations made by processing circuitry and/or any data received via interface. In some embodiments, processing circuitry 410 and the memory 420 may be considered to be integrated.

Reference is now made to FIG. 4.B showing a high-level logical diagram of the WD 116 or of the network node 111, 113, or 115.

For the WD 116, the WD comprises a processing module 430 and a communications module 440, which are operationally connected and arranged in such a manner so as to enable the WD 116 to also perform all actions described hereinabove in relation to the WD 116.

For the network node 111, 113, or 1115, the node comprises a processing module 430 and a communications module 440, which are operationally connected and arranged in such a manner so as to enable the WD 116 to also perform all actions described hereinabove in relation to the network node.

The communication module 440 may be used in the wireless communication of signalling and/or data between network node and the WD. For example, the communications module may comprise any sort of radio front end circuitry that may be coupled to, or in certain embodiments a part of, an antenna. Radio front end circuitry may further comprise filters and amplifiers.

The invention claimed is:

1. A method for adapting System Information (SI) acquisition in a Wireless Device (WD), the method comprising the steps of:
   a) when a target cell transmits SI where fields other than frame numbers do not change in different transmission periods over a certain period of time, obtaining by the WD from the target cell a Cell Global Identity (CGI) of the target cell within a first time period;
   b) otherwise, obtaining by the WD from the target cell the CGI of the target cell within a second time period longer than the first time period; and
   a first SI acquisition procedure (P1) being selected in step a) to obtain the CGI of the target cell within the first time period, and a second SI acquisition procedure (P2) being selected in step b) to obtain the CGI of the target cell within the second time period, the first SI acquisition procedure (P1) and the second SI acquisition procedure (P2) configured to apply different decoding mechanisms to acquire the SI of the target cell.

2. The method of claim 1, further comprising the step of:
c) prior to step a), using information as to whether or not the target cell is going to transmit SI that is Quasi-Stationary SI (QSI) where the fields other than frame numbers do not change in different transmission periods over the certain period of time to select a procedure for SI acquisition, wherein a first SI acquisition procedure is selected in step a) and a second SI acquisition procedure is selected in step b).

3. The method of claim 1, wherein in step a) the WD combines at least some fields, other than the fields related to frame numbers, from multiple SI transmissions, to acquire the SI.

4. The method of claim 3, wherein the fields related to frame numbers are fields that include a counter-like information of the frames.

5. The method of claim 2, wherein the information as to whether or not the target cell is going to transmit QSI includes a period of time of a certain length (TO) starting at a given reference time (Tr) during a cell change procedure of the WD towards the target cell.

6. The method of claim 2 wherein the method further comprises the step of:
determining or obtaining by the WD the information as to whether or not the target cell is going to transmit QSI for at least the certain period of time.

7. The method of claim 6, wherein the step of determining whether or not the target cell is going to transmit QSI for at least the certain period of time comprises receiving a message from a network node, the message being indicative of whether or not the target cell is going to transmit QSI for at least the certain period of time.

8. The method of claim 6, wherein the step of determining or obtaining by the WD the information as to whether or not the target cell is going to transmit QSI for at least the certain period of time comprises the WD making a determination using one of pre-defined rules, information from another node, and historical information.

9. The method as per claim 6, further comprising the step of:
following the acquisition of the SI, performing a cell change towards the target cell.

10. A Wireless Device (WD) comprising processing circuitry and a memory for storing instructions, the WD being configured to:
a) obtain from a target cell a Cell Global Identity (CGI) of a target cell within a first time period when the target cell transmits System Information (SI) where fields other than frame numbers do not change in different transmission periods over a certain period of time;
b) otherwise, obtain from the target cell the CGI of the target cell within a second time period longer than the first time period; and
a first SI acquisition procedure (P1) being selected in a) to obtain the CGI of the target cell within the first time period, and a second SI acquisition procedure (P2) being selected in b) to obtain the CGI of the target cell within the second time period, the first SI acquisition procedure (P1) and the second SI acquisition procedure (P2) configured to apply different decoding mechanisms to acquire the SI of the target cell.

11. The WD of claim 10 being further configured to use information as to whether or not a target cell is going to transmit SI that is Quasi-Stationary SI (QSI) where the fields other than frame numbers do not change in different transmission periods over the certain period of time to select a procedure for SI acquisition, wherein a first SI acquisition procedure is selected to obtain the CGI of the target cell within a first time period, and a second SI acquisition procedure is selected to obtain the CGI of the target cell within the second time period.

12. The WD of claim 10, wherein the WD is configured to combine at least some fields, other than the fields related to frame numbers, from multiple SI transmissions, to obtain the CGI of the target cell within a first time period.

13. The WD of claim 12, wherein the fields related to frame numbers are fields that include a counter-like information of the frames.

14. The WD of claim 11, wherein the information as to whether or not the target cell is going to transmit QSI includes a period of time of a certain length (TO) starting at a given reference time (Tr) during a cell change procedure of the WD towards the target cell.

15. The WD of claim 11, wherein the WD is further configured to determine or obtain the information as to whether or not the target cell is going to transmit QSI for at least the certain period of time.

16. The WD of claim 15, wherein determining whether or not the target cell is going to transmit QSI for at least the certain period of time comprises receiving a message from a network node, the message being indicative of whether or not the target cell is going to transmit QSI for at least the certain period of time.

17. The WD of claim 15, wherein determining or obtaining information as to whether or not the target cell is going to transmit QSI for at least the certain period of time comprises the WD making a determination using one of pre-defined rules, information from another node, and historical information.

18. The WD of claim 15, wherein the WD is further configured to, following the acquisition of the SI, perform a cell change towards the target cell.

19. A Wireless Device (WD) comprising a processing module and a memory module, the processing module being configured to:
a) obtain from the target cell a Cell Global Identity (CGI) of a target cell within a first time period when the target cell transmits SI where fields other than frame numbers do not change in different transmission periods over a certain period of time;
b) otherwise, obtain from the target cell the CGI of the target cell within a second time period longer than the first time period; and
a first SI acquisition procedure (P1) being selected in a) to obtain the CGI of the target cell within the first time period, and a second SI acquisition procedure (P2) being selected in b) to obtain the CGI of the target cell within the second time period, the first SI acquisition procedure (P1) and the second SI acquisition procedure (P2) configured to apply different decoding mechanisms to acquire the SI of the target cell.

20. The WD of claim 19 wherein the processing module is further configured to use information as to whether or not a target cell is going to transmit SI that is Quasi-Stationary SI (QSI) where the fields other than frame numbers do not change in different transmission periods over the certain period of time to select a procedure for SI acquisition, wherein a first SI acquisition procedure is selected to obtain the CGI of the target cell within the first time period, and a second SI acquisition procedure is selected to obtain the CGI of the target cell within the second time period.

21. The WD of claim 19, wherein the processing module is further configured to combine at least some fields, other than the fields related to frame numbers, from multiple SI transmissions, to obtain the CGI of the target cell within the first time period.

22. The WD of claim 19, wherein the fields related to frame numbers are fields that include a counter-like information of the frames.

23. The WD of claim 20, wherein the information as to whether or not the target cell is going to transmit QSI includes a period of time of a certain length (TO) starting at a given reference time (Tr) during a cell change procedure of the WD towards the target cell.

24. The WD of claim 20, wherein the processing module is further configured to determine or obtain the information as to whether or not the target cell is going to transmit QSI for at least the certain period of time.

25. The WD of claim 19, wherein determining whether or not the target cell is going to transmit QSI for at least the certain period of time comprises receiving a message from a network node, the message being indicative of whether or not the target cell is going to transmit QSI for at least the certain period of time.

26. The WD of claim 19, wherein determining or obtaining information as to whether or not the target cell is going to transmit QSI for at least the certain period of time comprises the WD making a determination using one of pre-defined rules, information from another node, and historical information.

27. The WD of claim 19, wherein the WD is further configured to, following the acquisition of the SI, perform a cell change towards the target cell.

* * * * *